(12) United States Patent
Aykac et al.

(10) Patent No.: US 8,384,037 B2
(45) Date of Patent: Feb. 26, 2013

(54) USE OF CRYSTAL LOCATION IN NUCLEAR IMAGING APPARATUS TO MINIMIZE TIMING DEGRADATION IN A PHOTODETECTOR ARRAY

(75) Inventors: Mehmet Aykac, Knoxville, TN (US); Mark Musrock, Oak Ridge, TN (US); Carlyle L. Reynolds, Acworth, GA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 719 days.

(21) Appl. No.: 12/558,394

(22) Filed: Sep. 11, 2009

(65) Prior Publication Data

US 2010/0084559 A1 Apr. 8, 2010

Related U.S. Application Data

(60) Provisional application No. 61/096,014, filed on Sep. 11, 2008.

(51) Int. Cl.
*G01T 1/20* (2006.01)

(52) U.S. Cl. .................................... 250/366; 250/367
(58) Field of Classification Search .................. 250/366, 250/367
See application file for complete search history.

(56) References Cited

U.S. PATENT DOCUMENTS

| | | | |
|---|---|---|---|
| 6,169,285 B1 * | 1/2001 | Petrillo et al. | 250/369 |
| 6,362,479 B1 * | 3/2002 | Andreaco et al. | 250/366 |
| 2003/0116713 A1 * | 6/2003 | Cooke et al. | 250/369 |

* cited by examiner

*Primary Examiner* — David Porta
*Assistant Examiner* — Mindy Vu
(74) *Attorney, Agent, or Firm* — Peter Kendall

(57) ABSTRACT

A method, disclosure relates to for improving detection of true coincidence events and differentiating them from events detected from scattered and random gamma photons, comprises receiving electromagnetic radiation at a plurality of photo detectors that was generated by a scintillating crystal impacted by a gamma photon, and processing data received at a subset of the plurality of photo detectors that are closer to a scintillating crystal, thereby improving a timing coincidence window for detecting a coincidence event.

11 Claims, 5 Drawing Sheets

USE OF CRYSTAL LOCATION IN NUCLEAR IMAGING APPARATUS TO MINIMIZE TIMING DEGRADATION IN A PHOTODETECTOR ARRAY

CROSS REFERENCE TO RELATED APPLICATIONS

The present application claims priority to U.S. Provisional Patent Application No. 61/096,014, filed on Sep. 11, 2008, which is hereby incorporated by reference in its entirety, for all purposes, herein.

BACKGROUND OF THE INVENTION

1. Technical Field

In general, the present disclosure relates to nuclear medical imaging. More particularly, the disclosure relates to Positron Emission Tomography (PET) imaging and accurate estimation of a timing coincidence window in a PET system.

2. General Background of the Invention

Nuclear medicine is a unique specialty wherein radiation emission is used to acquire images that show the function and physiology of organs, bones or tissues of the body. The technique of acquiring nuclear medicine images entails first introducing radiopharmaceuticals into the body—by either injection or ingestion. These radiopharmaceuticals are attracted to specific organs, bones, or tissues of interest. The radiopharmaceuticals produce gamma photon emissions, which emanate from the body and are then captured by a scintillation crystal. The interaction of the gamma photons with the scintillation crystal produces flashes of light or electromagnetic radiation in a different spectrum, which are referred to as "scintillation events." Scintillation events are detected by an array of photo detectors (such as photomultiplier tubes (PMT) of avalanche photodiodes (APD)), and their spatial locations or positions are then calculated and stored. In this way, an image of the organ or tissue under study is created from detection of the distribution of the radioisotopes in the body.

One particular nuclear medicine imaging technique is known as positron emission tomography, or PET. PET is used to produce images for diagnosing the biochemistry or physiology of a specific organ, tumor or other metabolically active site. The measurement of tissue concentration using a positron emitting radionuclide is based on coincidence detection of the two gamma photons arising from a positron annihilation or coincidence event. When a positron is annihilated by an electron, two 511 keV gamma photons are simultaneously produced and travel in approximately opposite directions. Gamma photons produced by a coincidence event can be detected by a pair of oppositely disposed radiation detectors capable of producing a signal in response to the interaction of the gamma photons with a scintillation crystal. Coincidence events are typically identified by a time coincidence between the detection of the two 511 keV gamma photons in the two oppositely disposed detectors; i.e., the gamma photon emissions are detected virtually simultaneously by each detector. When two oppositely disposed gamma photons each strike an oppositely disposed detector to produce a time coincidence event, they also identify a line-of-response (LOR) along which the coincidence event has occurred. An example of a PET method and apparatus is described in U.S. Pat. No. 6,858,847, which patent is incorporated herein by reference in its entirety.

FIG. 1 is a graphic representation of a line of response. A coincidence event 140 occurring in imaged object mass 130 can emit two simultaneous gamma photons (not shown) traveling substantially 180° apart. The gamma photons can travel out of scanned mass 130 and can be detected by block detectors 110A and 110B, where the detection area of the block detector defines the minimum area or maximum resolution within which the position of an incident gamma photon can be determined. Since block detectors 110A and 110B are unable to determine precisely where the gamma photons were detected within this finite area, the LOR 120 connecting block detectors 110A and 110B can actually be a tube with its radius equal to the radius of block detectors 110A and 110B. Similar spatial resolution constraints are applicable to other types of detectors, such as photomultiplier tubes.

In commercial PET, detection of individual 511 keV gamma photons is accomplished by crystal photoelectric absorption whereby the gamma photon's energy is converted to light, or some other electromagnetic radiation having a different frequency, by scintillation crystals contained within a detector. The production of the electromagnetic radiation by the scintillation crystal is known in the art as a scintillation event. Typically, PET photon detectors (photo detectors) are shared amongst an area of crystals to allow a small number of photo detectors to support a larger number of scintillation crystals as shown in FIG. 2.

The detector scintillation crystals are not optimally coupled to the photo detectors in a 1:1 configuration since such an implementation is cost prohibitive for a commercial whole body system. Multiple scintillation crystals can be associated with one photo detector. For example, FIG. 2 illustrates a physical layout of photo detectors 0-8. The photo detectors 0-8 used in a PET block detector can be, for example, PMTs or APDs. In the example illustrated in FIG. 2, APDs are used; however, PMTs or other photo detectors can also be used. Each photo detector is numbered consecutively starting at APD0 at the top left corner of the block. Nine APDs are arranged for detecting light emitted by 100 scintillation crystals.

Ideally, each event detected can be correlated with a corresponding coincidence event; however, in real-world applications, coincidence events are often detected because of scattered gamma photons or other random events (randoms). Randoms result in spurious detection of coincidence events and thereby create noise in a finally rendered image. Therefore, the ability to differentiate randoms from true coincidence events is a long-felt and unresolved problem in the art.

3. SUMMARY OF THE INVENTION

Accurate timing reduces the timing coincidence window. Accurate timing also minimizes the rate of the randoms thus improving overall prompt, i.e., all random, scatter and true coincidence events, to noise equivalent count rate (NECR) and improves the quality of images derived for a fixed scan time.

The present disclosure teaches a method and process for narrowing the timing coincidence window, thereby decreasing the amount of scatter and random events mistaken to be true coincidence events.

Specifically, disclosed herein is a method of increasing resolution of nuclear imaging coincidence events, whereby a gamma photon is emitted as the result of a coincidence event. The gamma photon is received at a scintillating crystal, this is known as a scintillation event. The scintillation event results in electromagnetic radiation emitted from the scintillation crystal in response to receiving the gamma photon. The electromagnetic radiation is collected by a plurality of photo detectors. Next a processor determines the location of the scintillating crystal based on information collected from the plurality of photo detectors. The processor, or a different processor, chooses only a subset of the photo detectors that are closer to the scintillating crystal to narrow a timing coincidence window of the coincidence event, which omits more random events.

A second embodiment includes a computer program embodied as computer-executable instructions stored on a computer-readable medium for increasing resolution of nuclear imaging coincident events. The computer program can determine a location of a scintillating crystal that emitted electromagnetic radiation detected by a plurality of photo detectors. The computer program further sums photon yields of the electromagnetic radiation for only a subset of photo detectors of the plurality of photo detectors that are closest to the scintillating crystal. The computer program also determines a time of a coincidence event corresponding to the emitted electromagnetic radiation.

A third embodiment includes a nuclear imaging apparatus. The apparatus includes a plurality of scintillating crystals configured to generate electromagnetic radiation in response to gamma photons. The apparatus further includes an array of photo detectors associated with the plurality of scintillating crystals configured to generate an electric charge in response to the electromagnetic radiation. The apparatus also includes a plurality of preamplifiers associated with the array of photo detectors. An analog adder configured to add the electric charge from the plurality of preamplifiers, and generating an added signal is also included. The apparatus also includes a time shaping amplifier associated with the analog adder and configured to filter the added signal, and a constant fraction discriminator configured to determine an arrival time of a detected gamma photon based on only a subset of photo detectors of the array of photo detectors.

4. DETAILED DESCRIPTION OF THE INVENTION

Figure 1:
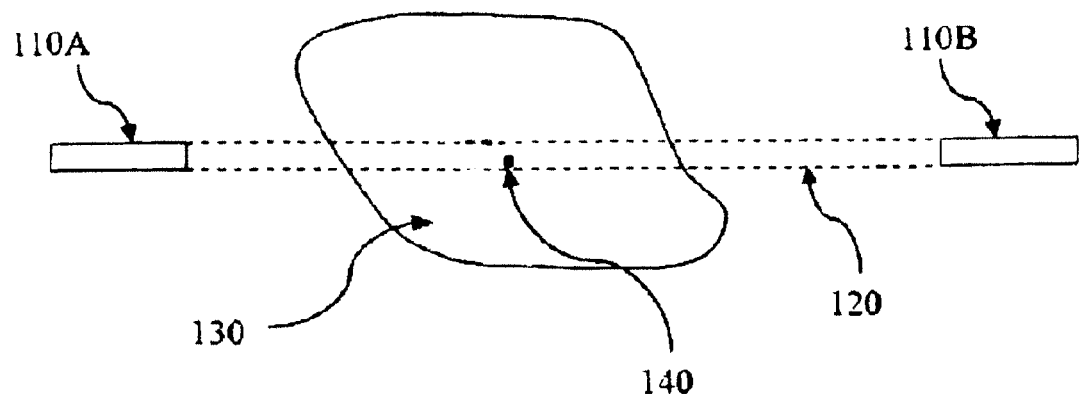
FIG. 1 illustrates a conceptual representation of a LOR in PET imaging.
Figure 2:
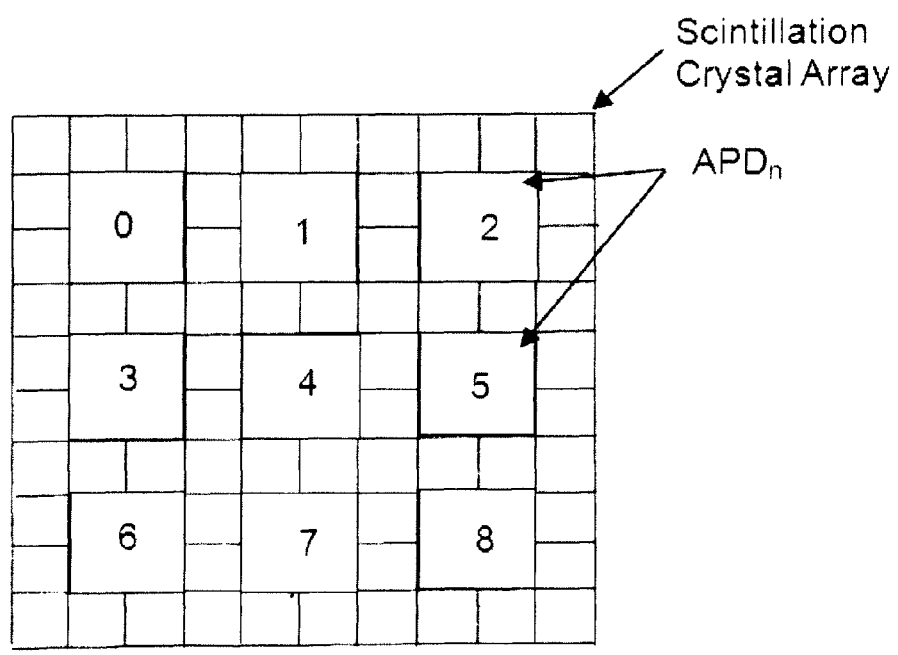
FIG. 2 illustrates example APD-based PET detector for utilizing shared photo detectors (100:9 crystal/APD ratio shown, $APD_n$=9)
Figure 3:
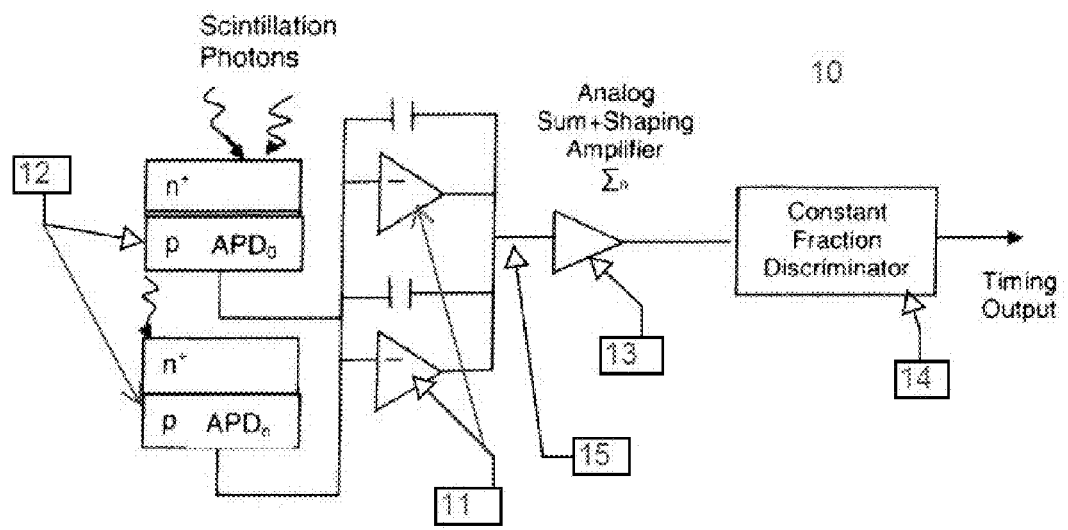
FIG. 3 illustrates an APD-based block detector timing signal architecture in accordance with an exemplary embodiment.

FIG. 3 illustrates an exemplary embodiment of an APD-based block detector timing signal architecture 10 of a PET scanner. Timing signal architecture 10 comprises low-noise charge-sensitive preamplifiers 11, which can be used with APDs 12, with moderate gain of about 100, to achieve timing coincidence window resolution values that are comparable to PMT-based detector blocks. A method is described which improves timing coincidence window resolution using a variable number of APDs to derive the timing signal based on the current detected photon's crystal location.

The charge liberated from each individual APD ($APD_n$=9 in the example given), when a gamma photon is detected by a scintillation crystal, can be integrated by a charge-sensitive preamplifier 11. N detector block APDs, for example 9, are summed into a single timing channel 15 and then filtered in a time shaping amplifier 13 (TSA) before being sent to a constant fraction discriminator 14 (CFD) for determining the detected gamma event's arrival time. A constant fraction discriminator (CFD), as is known in the art, is an electronic signal-processing device, designed to generate a time pick-off signal at the same fraction, f, of the input pulse height regardless of the amplitude. In true-constant-fraction (TCF) this time pick-off signal occurs at the zero-crossing time, $T_{TCF}$, as defined by Equation ( ). $T_{TCF}=T_d+ft_1$ where $T_d$ is the delayed input signal, f is the constant-fraction attenuation factor and $t_1$ is the inverted input signal (AN42, pgs 5-8 from ORTEC should be referenced here and 0019, we are pretty much quoting this document: http://www.ortec-online.com/application-notes/an42.pdf).

The total noise induced time jitter ($\sigma_{T(TCF)}$) is given by Equation (1), assuming that the noise can be time stationary and that the summed signal can be linear at the region where the zero crossing occurs.

$$\sigma_{T(TCF)} = \frac{\sigma_V \sqrt{1+f^2}}{V_A/t_{r1}}, \qquad (1)$$

where $\sigma_V$ is the total CFD input signal noise rms value, $f$ is the constant-fraction attenuation factor and $V_A/t_{r1}$ is an interpolated linear slope of the detector signal at the point in time when the inverted fractional detector signal $fV_A$ equals the delayed detector signal or the zero-crossover time. Embodiments take advantage of the fact that the total photon yield generated in a particular scintillation crystal may not be spread equally across all n photo detectors, but can be primarily region limited to a minor subset of the original n photo detectors. In other words, the photon yield can be greatest at the photo detectors that are closest to the light-emitting scintillation crystal. In addition, for the APD-based detector shown, the timing may not completely dominated by the photon statistics but can be degraded by the noise of all of the combined photon detectors chosen to be part of the timing signal. Moreover, the energy of the limited light that does reach the photo detectors farther from the scintillating crystal can be no greater than the noise generated by the photo detectors. Therefore, the noise can be a more dominant component of the signal for the photo detectors that are further away from the scintillating crystal.

Furthermore, while the embodiments described herein are illustrated using 3×3 APD-based blocks, other size APD-based blocks can be used. However, using an APD-based block of size 3×3, i.e., 9 APDs, results in greater improvement than using a smaller APD-based block because more noise can be removed due to more APD data not being processed in the coincidence timing window calculations.

Assuming fully uncorrelated noise, the total effective summed noise of n identical APDs at the same bias is ideally $$\sqrt{n}\sigma_{APD}, \qquad (2)$$

where $\sigma_{APD}$ is the rms value of the total noise of a single APD photo detector. If all of a specific crystal's scintillation light could be collected from a reduced subset of photo detectors, for example the photo detectors that are closest to the scintillating crystal, then a timing coincidence window improvement is achievable, e.g., for $APD_n=9$ versus $APD_n=4$, a timing resolution improvement of two-thirds could be approached. By using the reduced subset of photo detectors, the photo detectors that detect less electromagnetic radiation relative to the closest photo detectors are eliminated, and therefore their noise contributions are also removed. Still, it can be possible to improve the timing coincidence window resolution with the reduced set of photo detectors assuming that all of the photo detector signals have been sampled and can be combined in an optimal weighting. This limit may not be practically achievable since the light collected in the subset will likely be less than the total photon yield of all n photo detectors. During experiments to validate the method disclosed herein, light collection was measured for each APD in a 12×12 APD-based block, shown in FIG. 4, to verify the feasibility of the method using current APD-based blocks. As expected, the timing coincidence window resolution has the largest improvement near the corner regions of the block where the majority of light can be collected by the reduced subset of APDs because, in the exemplary embodiment, the scintillating crystals are arranged in a position profile that concentrates them in the corners of the APD-based scintillation block.

To demonstrate the timing resolution improvement, an experimental setup with a 12×12 APD-based scintillation block was connected in a dual circuit configuration with each photo detector given equal weighting to verify the timing coincidence window resolution improvement obtained with a reduced set of photo detectors compared with the timing resolution obtained with the total summed signal $$\sum_{n=0}^{8} APD_n, \quad (3)$$

A timing PMT and LSO crystal were used for the reference side of the timing experiment. At the highlighted corner crystal 51 in FIG. 4, the majority of photons are contained in the bottom-left region of the block. Accordingly, the scintillation crystal generating the electromagnetic radiation photons can be located near the bottom-left region of the block. The location of the scintillation crystal can be determined by, for example, summing groups of four adjacent APDs to determine which group has the highest photon yield. Once the location of the scintillating crystal can be determined, a subset of the nine ADPs can be chosen to determine the timing of the corresponding coincidence event. Specifically, an analog adder circuit can combine the signals from a subset of the nine APDs, in this example $APD_3+APD_4+APD_6+APD_7$, which results in a timing coincidence window resolution improvement of 24% compared to a total summed signal implementation described in Equation 3, as demonstrated by FIG. 5. The measurement of the timing signal can be taken, for example, with a nuclear instrumentation module (NIM)-based analog constant fraction discriminator (CFD).

Figure 4:
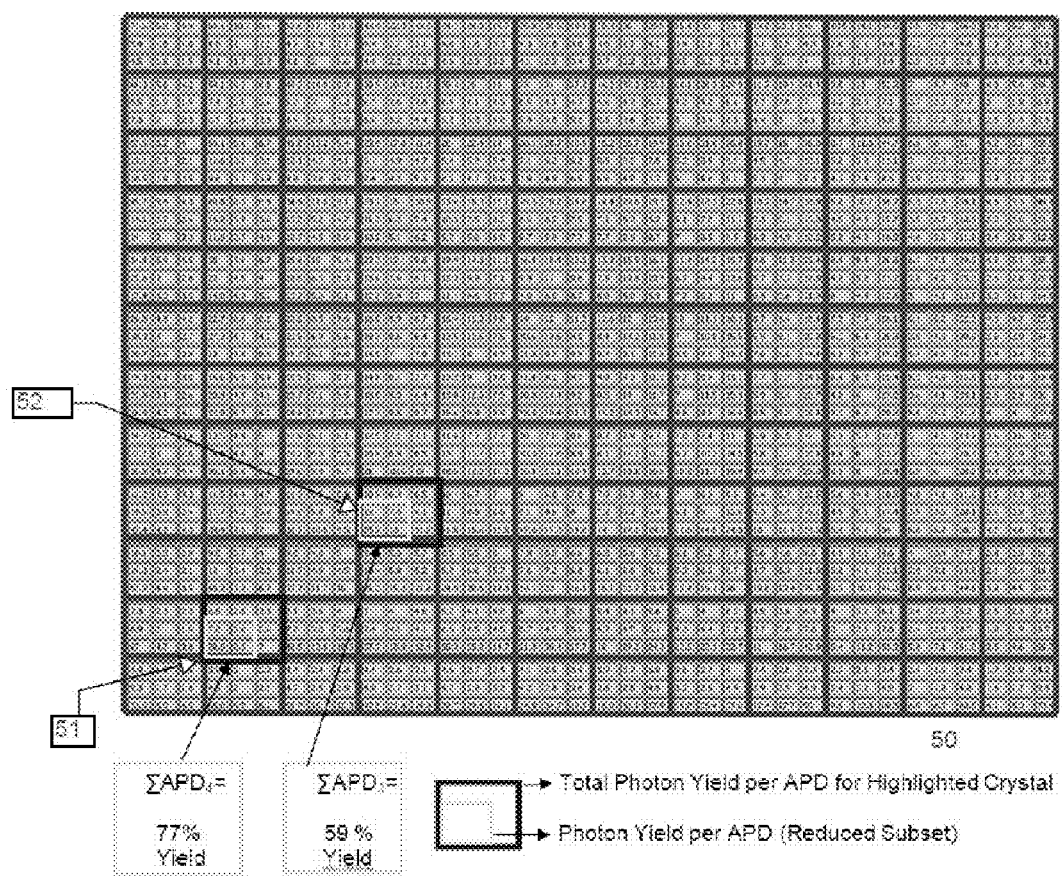
FIG. 4 illustrates photon yield per APD for a prototype 12×12 APD-based block in accordance with an exemplary embodiment.

In the example above, and illustrated in FIG. 4, the APD subset includes the four APDs in the lower-left corner of the 3.times.3 APD array. In some embodiments, the APD array can be static, i.e., the same APDs can be used for determining the timing of each coincidence event. However, in other embodiments, the APD subset can be chosen dynamically for each scintillation event based on the location of the scintillating crystal that emitted the electromagnetic radiations, thereby capturing a higher photon yield of the electromagnetic radiation.

The timing coincidence window improvement can be due in part to reduced noise in the overall summed detector signal. As described further below, a similar gain can be realized in a sampled implementation where each of the n APDs can be digitally sampled. At this corner location, the timing coincidence window improvement will likely be greater than in a more centrally located crystal where there can be a larger percentage of light propagating to all of the APDs in the block. In other words, the light can be more evenly distributed in the centrally located APD-based blocks because the position profile of the APDs can be more uniform than at the edges of the 12×12 array.

Figure 5:
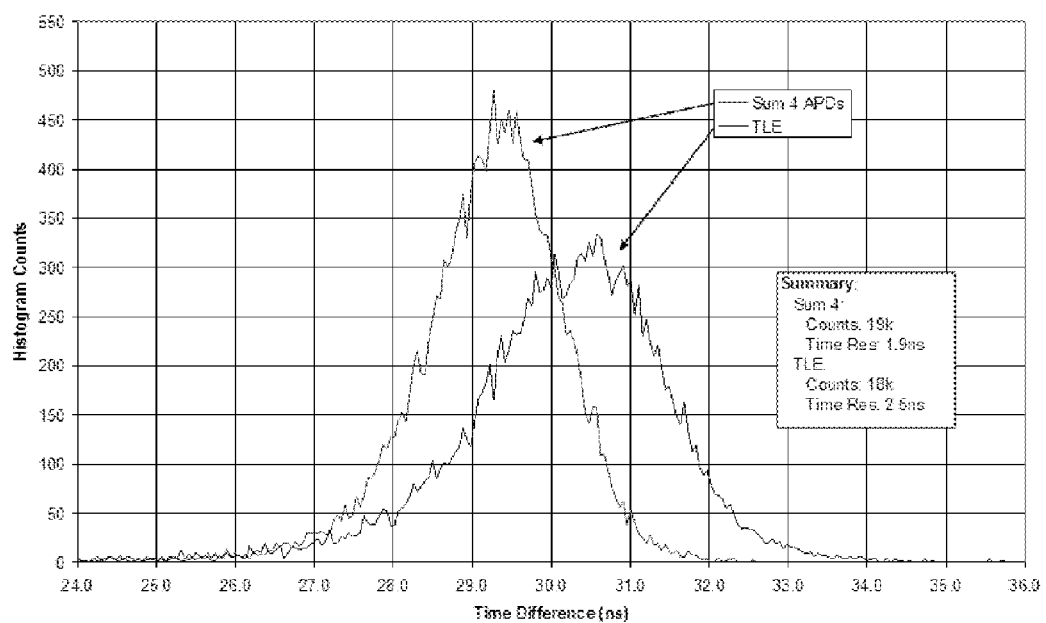
FIG. 5 illustrates coincident time resolution of an exemplary pixel in FIG. 4, analog timing signal derived from $APD_n$=9 (2.5 ns full width half maximum (FWHM)) vs. $APD_n$=4 (1.9 ns FWHM) in accordance with an exemplary embodiment.
Figure 6:
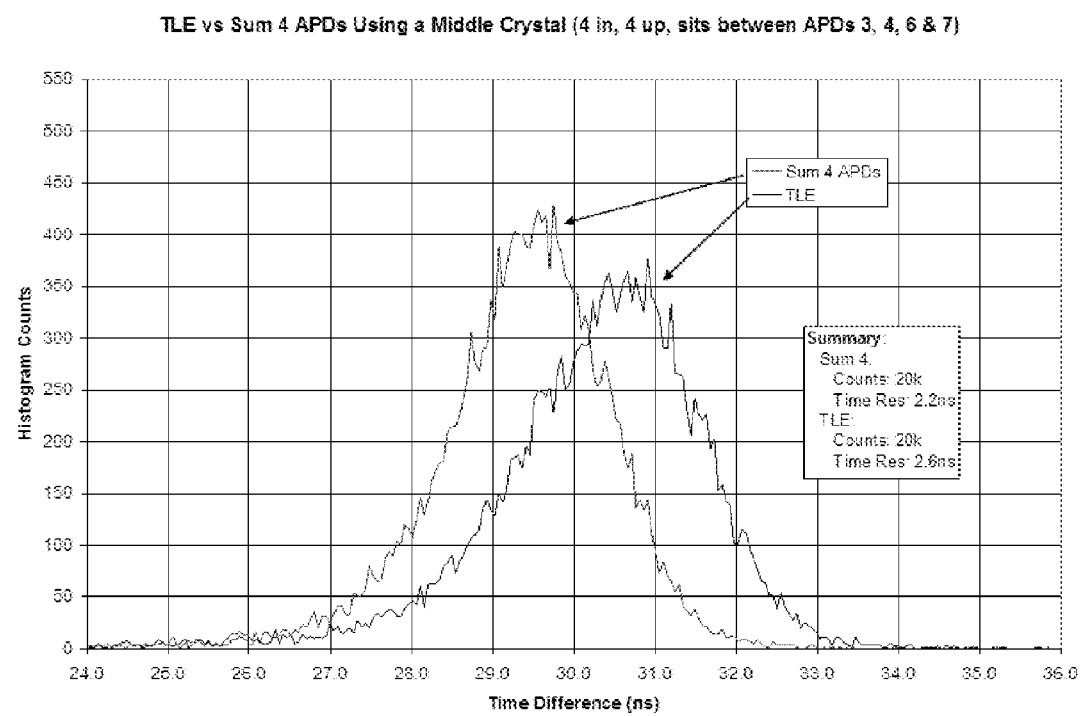
FIG. 6 illustrates coincident time resolution of an exemplary pixel in FIG. 4, analog timing signal derived from $APD_n$=9 (2.6 ns FWHM) vs. $APD_n$=4 (2.2 ns FWHM) in accordance with an exemplary embodiment.

A more centrally located crystal 52 is highlighted in FIG. 5; the APD subset timing coincidence window resolution given in FIG. 6 shows an improvement of 15% compared to a total summed signal implementation described in Equation 3.

This method could be used in a continuously sampled APD block detector for PET to improve the timing coincidence window resolution. Additional complexity can be involved in the proposed architecture in that each of the photo detector signals can to be sampled and a region-shared digital CFD can to be implemented for a practical implementation.

Optimized power dissipation (sample rate) and electromagnetic shielding are beneficial in practical applications since placing the sampling electronics near the low-noise high-gain preamplifiers can require careful detailed design due to the thousands of photo detectors (APDs), which are typical in many but not all applications.

The method and apparatus described above could be simplified by implementing a majority of the calculations in software rather than hardware. For example, the time shaping amplifier and constant fraction discriminator can be implemented in a computer readable medium. As is known in the art, a computer readable medium can include, for example, a hard disk drive, flash memory, a CD-ROM, or other non-volatile memory. The computer readable medium can be used in conjunction with a nuclear imaging apparatus comprising a computer for executing instructions in accordance with the exemplary embodiments.

Specifically, a charge generated at an APD can be digitally sampled and processed in a manner similar to the process executed by the apparatus described in FIG. 3. In particular, the charge generated by each ADP, or a subset thereof, can be summed in software and the maximum of the pulse can be determined with a constant fraction discriminator, also implemented in software, as is known in the art. Therefore, costs can be reduced because less hardware would be used to execute the method and process disclosed herein because they can be implemented in the computer readable medium.

Those of ordinary skill can vary the nuclear imaging apparatus and methods for processing the coincidence events without varying from the scope of the invention as defined in the appended claims.

We claim:

1. A method of increasing resolution of nuclear imaging coincidence events comprising:

emitting a gamma photon as the result of a coincidence event;

receiving the gamma photon at a scintillating crystal, thereby causing a scintillation event;

emitting electromagnetic radiation from the scintillation crystal in response to receiving the gamma photon, thereby producing emitted electromagnetic radiation;

collecting the emitted electromagnetic radiation by a plurality of photo detectors;

determining, by a processor, the location of the scintillating crystal based on information collected from the plurality of photo detectors;

choosing, by the processor, only a subset of the photo detectors that are closer to the scintillating crystal for collecting the emitted electromagnetic radiation to improve timing coincidence window resolution and narrow a timing coincidence window of the coincidence event, thereby omitting more random events; and determining, by the processor, a time of a coincidence event corresponding to the emitted electromagnetic radiation.

2. The method according to claim 1, wherein the plurality of photo detectors are avalanche photodiode diodes.

3. The method according to claim 1, wherein the plurality of photo detectors are photo multiplier tubes.

4. The method according to claim 1, wherein the subset of the photo detectors is chosen dynamically for each scintillation event.

5. The method according to claim 1, wherein the plurality of photo detectors comprise an array of nine or more photo detectors.

6. A computer program embodied as computer-executable instructions stored on a non-transitory computer-readable medium instructions stored on a computer-readable medium for increasing resolution of nuclear imaging coincident events, the program comprising instructions for:

determining a location of a scintillating crystal that emitted electromagnetic radiation detected by a plurality of photo detectors;

choosing only a subset of photo detectors of the plurality of photo detectors that are closer to the scintillating crystal for collecting the emitted electromagnetic radiation to improve timing coincidence window resolution and narrow a timing coincidence window of the coincidence event, thereby omitting more random events;

summing photon yields of the electromagnetic radiation for the subset of photo detectors of the plurality of photo detectors that are closest to the scintillating crystal; and determining a time of a coincidence event corresponding to the emitted electromagnetic radiation.

7. The computer program according to claim 6, further comprising outputting coincidence event information that contains fewer random coincidences than if photon yields of all of the plurality of are summed together.

8. The computer program according to claim 6, wherein the plurality of photo detectors are avalanche photodiode diodes.

9. The computer program according to claim 6, wherein the plurality of photo detectors are photo multiplier tubes.

10. The computer program according to claim 6, wherein the subset of the photo detectors is determined dynamically for each scintillation event.

11. The computer program according to claim 6, wherein the plurality of photo detectors comprise an array of nine or more photo detectors.

* * * * *